(12) United States Patent
Buggs et al.

(10) Patent No.: US 7,874,670 B2
(45) Date of Patent: Jan. 25, 2011

(54) SUNGLASSES SECURED WITH FASHIONABLE TAPERED FABRIC COMPONENT

(76) Inventors: Kenneth Allen Buggs, 3920 N. 44th St., Milwaukee, WI (US) 53216; Dovie Deana Gilmore, 10001 W. Appleton Ave., Apt. #206, Milwaukee, WI (US) 53225

( * ) Notice: Subject to any disclaimer, the term of this patent is extended or adjusted under 35 U.S.C. 154(b) by 0 days.

(21) Appl. No.: 12/456,597

(22) Filed: Jun. 19, 2009

(65) Prior Publication Data

US 2010/0321628 A1 Dec. 23, 2010

(51) Int. Cl.
*G02C 3/00* (2006.01)
(52) U.S. Cl. ..................................... 351/156
(58) Field of Classification Search ............... 351/156, 351/157, 116, 123, 111, 118, 41, 158; D16/65–70
See application file for complete search history.

(56) References Cited

U.S. PATENT DOCUMENTS

| 1,596,019 | A | * | 8/1926 | Nelson | 351/156 |
| D178,328 | S | * | 7/1956 | Tilton | D16/311 |
| D254,377 | S | * | 3/1980 | Czerefkow | D16/311 |
| 4,818,094 | A | * | 4/1989 | Lyons | 351/157 |
| 4,930,885 | A | * | 6/1990 | Laschober | 351/156 |
| 5,594,511 | A | * | 1/1997 | Lin | 351/116 |
| 5,781,273 | A | * | 7/1998 | Boden | 351/156 |
| 7,059,717 | B2 | * | 6/2006 | Bloch | 351/119 |
| 7,419,260 | B1 | * | 9/2008 | Wang | 351/156 |
| 7,661,816 | B2 | * | 2/2010 | Tsai | 351/123 |

* cited by examiner

*Primary Examiner*—Hung X Dang

(57) ABSTRACT

The present invention is a novel apparatus comprising tapered fabric components which cover or replace the eyeglass frame arms, and which are secured to the eyeglass frames by a discrete attachment means which gives the appearance that the eyeglass and fabric components are a unitary accessory.

3 Claims, 4 Drawing Sheets

SUNGLASSES SECURED WITH FASHIONABLE TAPERED FABRIC COMPONENT

I claim priority to provisional application No. 61/073,703 "SUNGLASSES SECURED WITH FASHIONABLE TAPERED FABRIC COMPONENT", filed Jun. 18, 2008.

FIELD OF INVENTION

This invention relates generally to field of sunglasses, and more specifically to eyeglasses secured with a fashionable tapered fabric component.

BACKGROUND

Non-prescription sunglasses are a $2-3 billion per year annual market. A growing consumer awareness of the harmful effects of ultra-violet rays and the protective benefit of sunglasses, have led consumers to a number of novel and stylish sunglass designs, competing within various price and consumer preference niches.

Bandannas, headbands and other cloth accessories are often worn on the head for aesthetic effect, fashion variation and self-expression. Fabric head accessories may be color coordinated, and may be tied and worn in various expressive and functional ways. Bandannas, head scarves and headbands are often worn in a manner such so that appearance of the cloth is conspicuous and decorative, regardless of the function the fabric is intended to serve (e.g., covering the head from weather elements, absorbing perspiration or for use in wiping the nose or eyes).

Attempts to combine tapered fabrics with sunglasses are known in the art. For example, US Patent Application No. 2003/011741 A1 ("Gong '741") teaches the use of attachment to sunglasses by key ring and Velcro. However, the key ring is clearly visible and detracts from the appearance of sunglasses and fabric as a single accessory. Further, Velcro is a problematic means for securing sunglasses as it presents difficulty in matching the connecting Velcro strips, and attracts sand, debris and perspiration in settings where sunglasses are traditionally worn. The functionality of Velcro is impaired by continuous laundering. Additionally, the fabric attachments taught in Gong '741 are voluminous, and require specially configured glass frames without eyeglass frame arms or alternatively require that the eye glass frame arms be removed. However, eyeglass frame arms may provide desired support for the glasses on the frame tapered fabrics retain their distinctive and stylish characteristic appearance when used to secure sunglasses.

It is desirable to combine the protective elements of sunglasses with the aesthetic appeal of a fabric accessory, and to have an aesthetically appealing fabric accessory to secure sunglasses to a user's face or head.

SUMMARY OF THE INVENTION

The present invention incorporates a fabric accessory which fits over existing eyeglass frames with or without removing the eyeglass frame arms.

The present invention is a novel apparatus comprising eyeglasses having apertures to accommodate two washable tapered fabric components which are secured by a snap, and which give the appearance of the sunglasses and the tapered fabric as a singly constructed accessory. In various embodiments, the tapered fabric components may be contoured or proportioned, may be of various dimensions, styles, textures, materials and configurations (e.g., cotton, mesh, silk, linen, woven materials, water resistant, etc). In various embodiments the tapered fabric components may be selectively removed and interchanged, or may be sold separately.

GLOSSARY

As used herein, the term "tapered fabric component" shall refer to a fabric having the appearance of a tapered fabric which may be attached to an eyeglass frame having apertures without the use of rings, bands, or pins. A tapered fabric component may be constructed of any flexible material such as material fibers, cottons, synthetic flexible plastic, etc. It may be contoured and may contain sewn or finished seams, and may include components such as snaps, hooks, eyes or wire inserts. Tapered fabric components may further include channels, pockets and apertures to conceal or partially cover eyeglass frame arms, and may further include any ornamentation known in the art.

As used herein, the term "eyeglass frame" or "sunglass frame" shall mean an eyeglass or sunglass frame with structural components such as apertures, grooves or locking members to accommodate discreet and aesthetically appealing of an attachment component.

As used herein, the term "discrete attachment" means a snap, hook, interlocking component, buckle non-velcro adhering member, magnet, stitching or other means. Generally a discrete attachment will be configured to blend or minimize visibility.

As used herein, the term "eyeglass frame arm" means a component of an eyeglass frame which extends from the frame which hold the lens and secures that portion of frame. Generally a eyeglass frame arm includes a curved component to which secures the entire eyeglass from to a user's head. An eyeglass frame arm is generally connected to eyeglasses by a hinge.

As used herein, the term "sunglasses" includes traditional eyeglasses for indoor use, as well as all forms of goggles.

DETAILED DESCRIPTION OF EMBODIMENTS OF THE INVENTION

Figure 1:
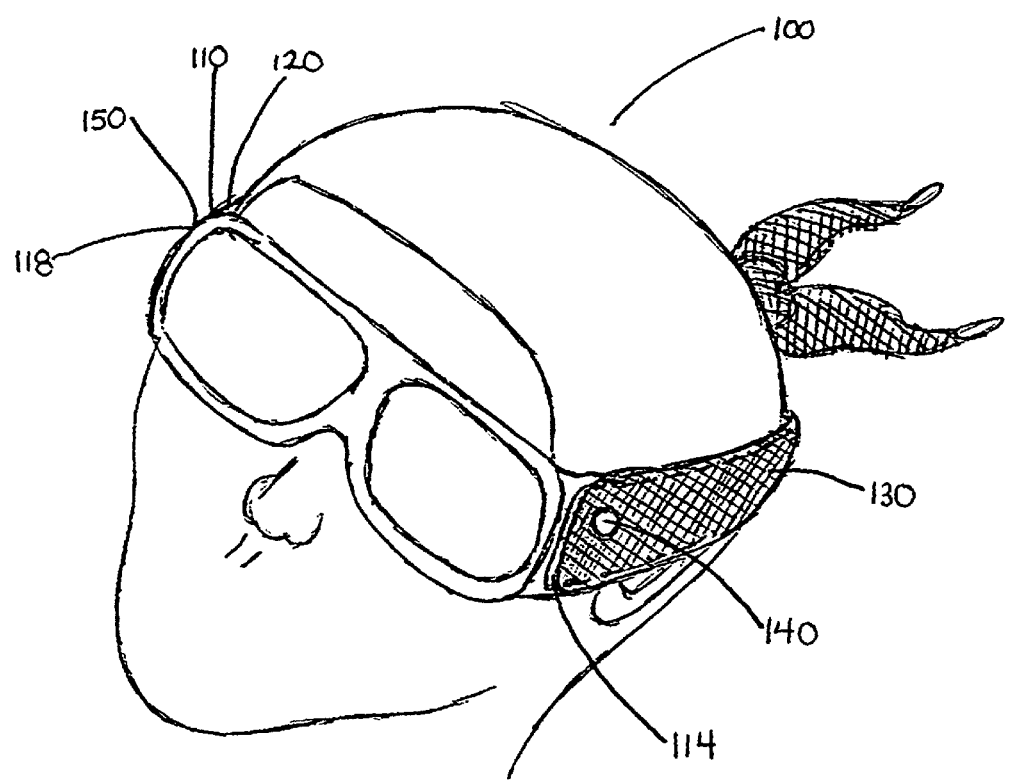
FIG. 1 illustrates an exemplary embodiment of combined sunglass tapered fabric accessory worn by a user.
Figure 1:
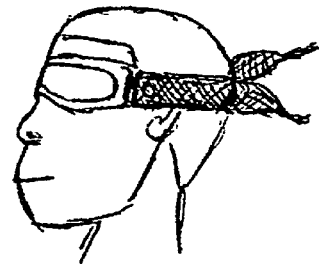

For the purpose of promoting am understanding to the present invention references are made in the text hereof to embodiments of the sunglass and tapered fabric accessory, only some of which are described herein. It should nevertheless be understood that no limitations on the scope of the invention are thereby intended. One of ordinary skill in the art will readily appreciate that modifications such as different discrete attachment means and variations in the size and appearance of the tapered fabric component. Some of these possible modifications are mentioned in the following description. Therefore, specific details disclosed herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale, emphasis instead being placed upon illustrating the principles of the invention. In addition, in the embodiments depicted herein, like reference numerals in the various drawings refer to identical or near identical structural elements.

Moreover, the term "substantially" or "approximately" as used herein may be applied to modify any quantitive representation that could permissibly vary without resulting in a change in the basic function to which it is related.

Referring now to the drawings, FIG. 1 shows am exemplary embodiment to combined sunglass and tapered fabric accessory 100 in which eyeglass frame 110 is directly secured to two fashionable tapered fabric components 120 and 130 which are tied around the head of a user. FIG. 1 further illustrates discrete attachments 140 and 150 (not visible in this drawing) which are used to secure fashionable tapered fabric components 120 and 130 to eyeglass frame 110 through eyeglass apertures 114 and 118 (not visible in this drawing).

Figure 2A:
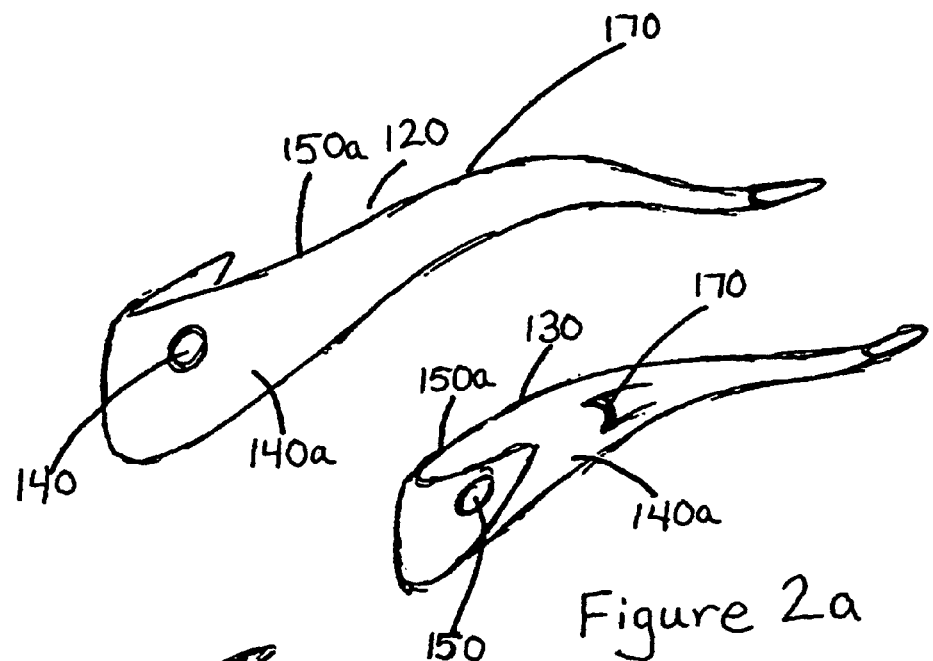
FIG. 2a illustrates one embodiment of a tapered fabric component.

FIG. 2a illustrates an exemplary embodiment of fashionable tapered fabric components 120 and 130. In the embodiment shown, discrete attachments 140 and 150 are snaps, one half of which is attached to outer fashionable tapered fabric component surfaces 140a and 150a, and half of which are attached to inner fashionable tapered fabric component surfaces 140b and 150b. In the embodiment shown, tapered fabric components 120 and 130 also include slits 170a and 170b into which eyeglass frame arms are inserted.

Figure 2B:
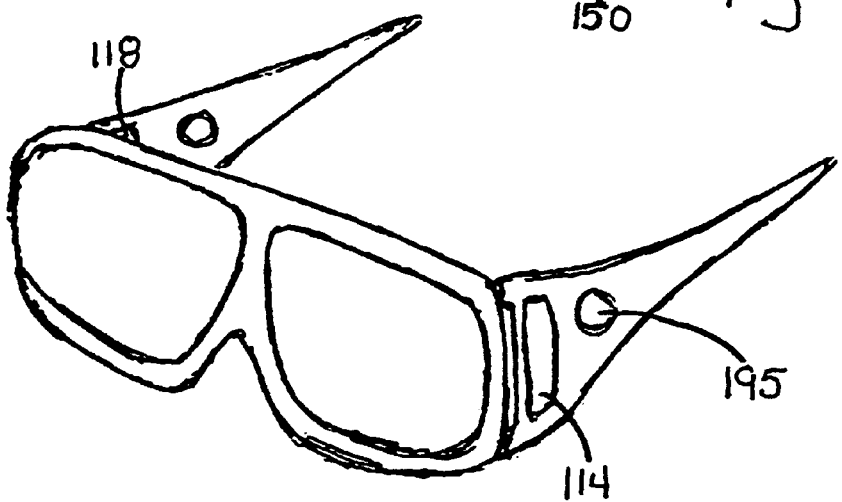
FIG. 2b illustrates an exemplary embodiment of combined sunglass tapered fabric accessory worn by a user.

As illustrated in FIG. 2b, discrete attachments 140 and 150 to allow fashionable tapered fabric components 120 and 130 to be threaded and/or looped directly through apertures 114 and 118 in eyeglass frames without the need for an additional attachment means or component, thus maintaining a smooth and continuous aesthetic appearance of fashionable tapered fabric components 120 and 130 and eyeglass frame 110 being a unitary or coordinated accessory, rather than one in which tapered fabric components are attached by a visible pin or ring. Some embodiments of combined sunglass and tapered fabric accessory 100 may include an additional aperture 195 in the eyeglass arms 190a and 190b and in tapered fabric components 120 and 130 to allow discrete attachment to be snapped, affixed or closed.

Figure 3:
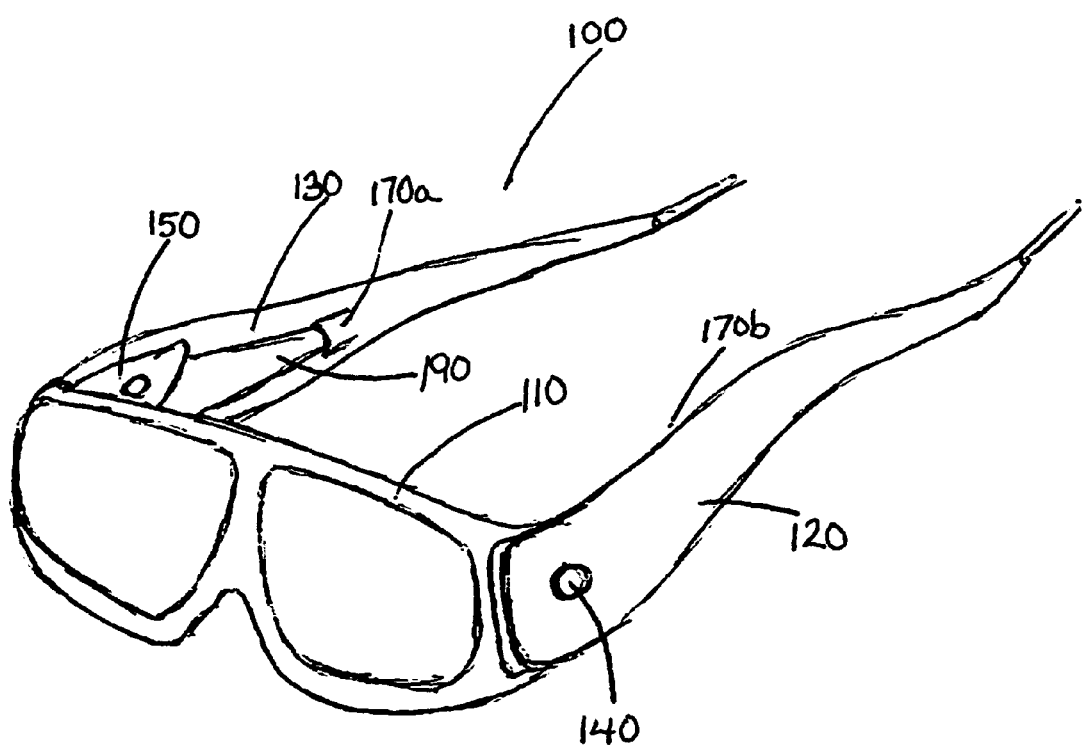
FIG. 3 illustrates an further exemplary embodiment of combined sunglass tapered fabric accessory.

FIG. 3 illustrates an exemplary embodiment of combined sunglass and tapered fabric accessory 100 which illustrates how eyeglass frame arms 190a and 190b (not visible) are inserted into slits 170a and 170b. In the embodiment shown, tapered fabric components 120 and 130 are sewn or glued together to form an internal channel/pocket/compartment for eyeglass frame 190.

Figure 4:
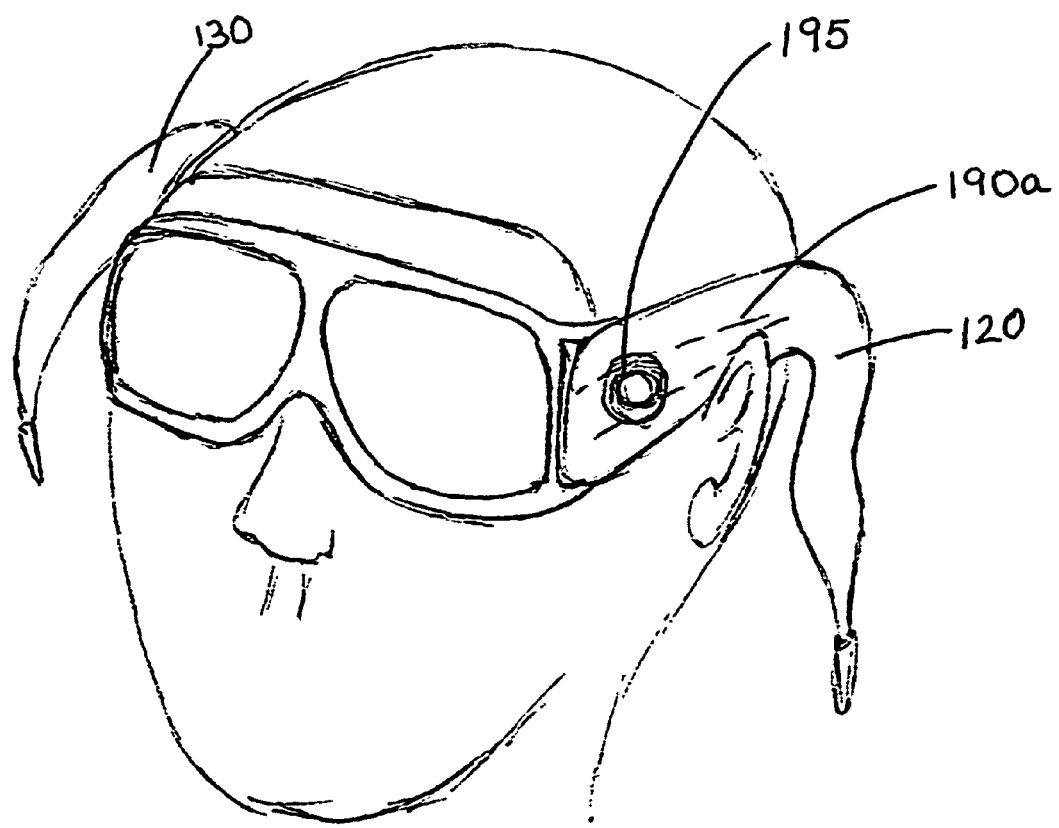
FIG. 4 illustrates a further exemplary embodiment of combined sunglass tapered fabric accessory worn by a user in which the tapered fabric components are not tied.

FIG. 4 illustrates a further exemplary embodiment of combined sunglass tapered fabric accessory worn by a user in which the tapered fabric components are not tied, in which combined sunglass and tapered fabric accessory 100 is supported by eyeglass frame arms 190a and 190b (not visible) within the internal pocket/channel/compartment of tapered fabric components 120 and 130.

We claim:

1. An eyeglass assembly, having two tapered fabric component, connected with two eyeglass frame arms comprising: two apertures on each of two eyeglass frame arms, a first aperture adjacent to eyeglass lens frame defining an insertion for said tapered fabric component on each of said eyeglass frame arms, and a second aperture adjacent to said first aperture defining an insertion for a discrete attachment, wherein said each tapered fabric comprising a slit defining an insertion for securely stabilizing each of two said eyeglass frame arms.

2. An eyeglass assembly as set forth in claim 1, comprising of two or more fabric pieces combinatorial sewn or glued around the edges, innermost of said fabric pieces comprising a slit forming a compartment for said eyeglass frame arm insertion.

3. An eyeglass assembly as set forth in claim 1, wherein said discrete attachment which is selected from the group of a snap sewn or glued to each said tapered fabric components forming additional secure attachment to said eyeglass frame arm.

* * * * *